United States Patent
Amanullah et al.

(10) Patent No.: US 10,422,194 B2
(45) Date of Patent: Sep. 24, 2019

(54) METHOD OF CONVERSION OF A DRILLING MUD TO A GEL-BASED LOST CIRCULATION MATERIAL TO COMBAT LOST CIRCULATION DURING CONTINUOUS DRILLING

(71) Applicant: Saudi Arabian Oil Company, Dhahran (SA)

(72) Inventors: Md Amanullah, Dhahran (SA); Turki Thuwaini Mohammed Alsubaie, Dhahran (SA); Abdulaziz Salah Bubshait, Dhahran (SA); Omar Abdulwahab Al-Fuwaires, Dammam (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 16/375,281

(22) Filed: Apr. 4, 2019

(65) Prior Publication Data

US 2019/0226288 A1   Jul. 25, 2019

Related U.S. Application Data

(60) Division of application No. 15/606,521, filed on May 26, 2017, which is a continuation of application No.
(Continued)

(51) Int. Cl.
*E21B 21/00* (2006.01)
*C09K 8/508* (2006.01)
(Continued)

(52) U.S. Cl.
CPC ............ *E21B 21/003* (2013.01); *C04B 28/02* (2013.01); *C09K 8/04* (2013.01); *C09K 8/487* (2013.01);
(Continued)

(58) Field of Classification Search
None
See application file for complete search history.

(56) References Cited

U.S. PATENT DOCUMENTS 2,265,773 A   12/1941   Larkin
2,561,075 A   7/1951   Sidwell
(Continued)

FOREIGN PATENT DOCUMENTS

| GB | 938567 | 10/1963 |
|---|---|---|
| WO | 9318111 A1 | 9/1993 |
| WO | 2010017899 A2 | 2/2010 |

OTHER PUBLICATIONS

"Lost circulation" retrieved from http://www.glossary.oilfield.slb.com/Terms/l/lost_circulation.aspx on May 5, 2016.
(Continued)

*Primary Examiner* — Angela M DiTrani Leff
(74) *Attorney, Agent, or Firm* — Bracewell LLP; Constance G. Rhebergen

(57) ABSTRACT

A method of conversion of a water-based mud to a gel-based LCM quickly to control lost circulation in a lost circulation zone in a wellbore during continuous drilling with a drilling mud, the drilling mud comprises a volcanic ash, water, a de-foamer, a pH buffer, and a polymer. The method comprises the steps of entering the lost circulation zone, determining a lost circulation volumetric flow rate, metering a first amount of a binder into the drilling mud to create a binder containing mud, pumping the binder containing drilling mud into the wellbore, and suspending metering of the first amount of the binder to the drilling mud after a pre-defined regulating period of time effective to permit the binder containing drilling mud to create a gel-based LCM operable to alter the lost circulation zone.

6 Claims, 6 Drawing Sheets

Related U.S. Application Data

14/294,378, filed on Jun. 3, 2014, now Pat. No. 9,695,653.

(60) Provisional application No. 61/830,287, filed on Jun. 3, 2013.

(51) Int. Cl.

| | |
|---|---|
| *C09K 8/04* | (2006.01) |
| *C09K 8/487* | (2006.01) |
| *C04B 28/02* | (2006.01) |
| *C04B 103/00* | (2006.01) |

(52) U.S. Cl.
CPC ...... *C09K 8/508* (2013.01); *C04B 2103/0028* (2013.01)

(56) References Cited

U.S. PATENT DOCUMENTS

| | | |
|---|---|---|
| 2,610,149 A | 9/1952 | Dyke |
| 2,779,417 A | 1/1957 | Clark, Jr. et al. |
| 3,053,764 A | 9/1962 | Hummel et al. |
| 3,448,800 A | 6/1969 | Parker et al. |
| 3,499,491 A | 3/1970 | Wyant et al. |
| 3,557,876 A | 1/1971 | Tragesser |
| 3,605,898 A | 9/1971 | Harrison et al. |
| 4,217,965 A | 8/1980 | Cremeans |
| 4,223,733 A | 9/1980 | Bodor et al. |
| 4,247,403 A | 1/1981 | Foley et al. |
| 4,460,052 A | 7/1984 | Gockel |
| 4,547,298 A | 10/1985 | Novak |
| 5,295,543 A | 3/1994 | Terry et al. |
| 5,377,760 A | 1/1995 | Merrill |
| 5,399,548 A | 3/1995 | Patel et al. |
| 5,501,277 A | 3/1996 | Onan et al. |
| 5,629,271 A | 5/1997 | Dobson et al. |
| 5,711,383 A | 1/1998 | Terry et al. |
| 6,260,409 B1 | 7/2001 | Briaud et al. |
| 6,619,394 B2 | 9/2003 | Soliman et al. |
| 6,686,323 B2 | 2/2004 | Nilsson et al. |
| 6,739,806 B1 | 5/2004 | Szymanski et al. |
| 7,271,131 B2 | 9/2007 | Halliday et al. |
| 2002/0128158 A1 | 9/2002 | Green |
| 2003/0195120 A1 | 10/2003 | Halliday et al. |
| 2006/0041060 A1 | 2/2006 | George et al. |
| 2006/0079408 A1 | 4/2006 | Verret |
| 2007/0034410 A1 | 2/2007 | Xiang |
| 2007/0261855 A1 | 11/2007 | Brunet et al. |
| 2008/0070811 A1 | 3/2008 | Dino et al. |
| 2008/0196628 A1 | 8/2008 | Santra et al. |
| 2009/0000361 A1 | 1/2009 | Bloomquist et al. |
| 2009/0188718 A1 | 7/2009 | Kaageson-Loe et al. |
| 2010/0193244 A1 | 8/2010 | Hoskins |
| 2010/0254214 A1 | 10/2010 | Fisher et al. |
| 2011/0162845 A1 | 7/2011 | Ravi et al. |
| 2012/0305248 A1 | 12/2012 | Ravi et al. |
| 2012/0322698 A1 | 12/2012 | Dealy et al. |
| 2013/0065798 A1 | 3/2013 | Amanullah et al. |
| 2013/0087330 A1 | 4/2013 | Sodhi et al. |
| 2013/0160998 A1 | 6/2013 | Auzerais et al. |

OTHER PUBLICATIONS

International Search Report and Written Opinion for International Application No. PCT/US2014/040597; International Filing Date Jun. 3, 2014; Report dated Sep. 25 Sep. 25, 2014 (pp. 1-14).

Weight Placed = 100 gm

SAVA Mud
Two Hours Ageing

SAVA Converted
Gel-based LCM-C30
Two Hours Ageing

SAVA Converted
Gel-based LCM-C60
Two Hours Ageing

Weight Placed
≈ 200 gm

Weight Placed
≈ 300 gm

Weight Placed
= 500 gm

METHOD OF CONVERSION OF A DRILLING MUD TO A GEL-BASED LOST CIRCULATION MATERIAL TO COMBAT LOST CIRCULATION DURING CONTINUOUS DRILLING

RELATED APPLICATIONS

This patent application is a divisional of U.S. patent application Ser. No. 15/606,521 filed on May 26, 2017, which is a continuation of U.S. patent application Ser. No. 14/294,378 filed on Jun. 3, 2014 now U.S. Pat. No. 9,695,653 issued on Jul. 4, 2017, which claims priority from U.S. Provisional App. No. 61/830,287 filed on Jun. 3, 2013. For purposes of United States patent practice, this application incorporates the contents of all non-provisional and provisional applications by reference in their entirety.

BACKGROUND

Field of the Invention

Embodiments of the invention generally relate to methods to control lost circulation in a lost circulation zone in a wellbore during continuous drilling with a drilling mud. More specifically, embodiments of the invention relate to methods for converting a drilling mud into a gel-based LCM (lost control material) composition during continuous drilling.

Description of the Related Art

Lost circulation is one of the frequent challenges encountered during drilling operations. Lost circulation, which can be encountered during any stage of operations, occurs when drilling fluid (or drilling mud) pumped into a well returns partially or does not return to the surface. While some fluid loss is expected, fluid loss beyond acceptable norms is not desirable from a technical, an economical, or an environmental point of view. About 75% of the wells drilled per year encounter lost circulation problems to some extent. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well. In addition, delays in controlling lost circulation can lead to highly complex problems, including the failure to control the lost circulation in any meaningful way.

Billions of dollars are lost per year due to lost circulation in drilling operations. Lost dollars are due to losses of drilling fluids, losses of production, and the costs of lost circulation materials (LCMs) used in combating lost circulation.

Lost circulation can cause environmental problems if drilling muds or LCMs interact with the environment surrounding the reservoir. Conventional LCMs pose a risk to sensitive environments, such as marine environments because they are not biodegradable and can be toxic to marine life. Public awareness of drilling operations, including the drilling fluids used, has contributed to demands from environmental regulatory bodies to develop biodegradable and virtually non-toxic LCMs.

Lost circulation can be categorized as seepage type, moderate type, severe type, and total loss, referring to the amount of fluid or mud lost. The extent of the fluid loss and the ability to control the lost circulation with an LCM depends on the type of formation in which the lost circulation occurs. Formations with low permeability zones, i.e., those with microscopic cracks and fissures, usually have seepage type lost circulation. Seepage type lost circulation experiences a loss of less than 10 bbl/hour for water based drilling muds, or about 10 bbl/hr for oil based drilling muds. Formations with narrow fracture sizes and lower fracture density usually trigger a moderate loss of drilling mud. A moderate type lost circulation experiences a loss at a rate in the range of about 10 bbl/hr to about 100 bbl/hr. Formations with high permeability zones, such as super-K formations, highly fractured formations with large fracture sizes and high fracture density, often experience very high mud loss with a drastic increase in total mud and mud management costs. A severe type lost circulation experiences losses of greater than about 100 bbl/hr. Formations with inter-connected vugular and cavernous zones or formations with induced inter-vugular connection often cause massive loss of drilling mud with no return of circulation. It is possible for one wellbore to experience all of these zones.

Other formations may experience lost circulation if an improper mud weight is used while drilling. Such formations include narrow mud weight window, low fracture gradient, depleted reservoir pressure, formations with soluble minerals such as halite, evaporate, and anhydrite.

In general, seepage type and moderate type losses occur more frequently than severe type lost circulation. In the Saudi Arabian fields, however, the formations encountered while drilling reservoir and non-reservoir sections have unique depositional histories and matrix characteristics that make the super-K, fractured, vuggy, cavernous, faulted characteristics of the carbonate rock formations prone to moderate to massive loss of drilling fluid. Some of the losses are so massive that hundreds of barrels of mud are lost in an hour with no return of fluid to the mud return line, as the rate of loss usually exceeds the rate of replacement of drilling mud. Thus, even though the frequency of severe lost circulation is less than seepage or moderate lost circulation, severe lost circulation has a significant economic impact on drilling operations.

LCMs are used to mitigate the lost circulation by blocking the path of the fluid. The type of LCM used in a loss circulation situation depends on the extent of lost circulation and the type of formation. Conventional LCMs, currently available in the industry, include particulates, flaky materials, granular materials, and gel LCMs including cross-linked gels, cross-linked polyacrylamides, polyacrylates, super absorbing polymers (SAP), or a combination of the above. Conventional gel LCMs typically contain one or more polymers, one or more monomers, one or more cross-linkers, including chemical cross-linkers, a cross-linking initiator, and a fluid phase, such as water or oil. Some formulations may include particles.

For zones experiencing seepage type to moderate type lost circulation, conventional LCMs that include particulates, flakes, gels and/or a combination are often effective in controlling the loss zones. Polymeric and gel LCMs are also commonly used to control moderate to severe loss of circulation, due to their ability to swell, gel, crosslink, and/or expand. For example, SAPs expand many times in volume in the presence of water. The swelling, gelling, crosslinking, and/or expansion of the LCMs helps to stop the loss of drilling mud by plugging the fractures and/or the vugs. However, many high permeability zones experience limited success in attempts to control a lost circulation event, even with the use of conventional non-gel and gel LCMs. For formations with massive loss of drilling mud, current chemical methods of loss control rarely work.

Poor control in a lost circulation zone is often due to the LCM itself. The efficacy of a gel LCM depends in large part on the fracture dimensions, but also on the gel characteristics, namely the gel stiffness modulus and the yield strength. The gel stiffness modulus and the yield strength are indicative of the extent to which the gel LCM resists flow when forces are applied. Gel stiffness modulus is the extent to which a material resists deformation in response to an applied load, i.e. it is a measure of the rigidity of the material. Yield strength is a measure of the strength of a material, it is the force required to initiate plastic deformation. A high gel stiffness modulus and high yield strength indicate a gel that is resistant to deformation and that is therefore likely to solidify into a rigid gel. A gel with a low yield strength and low gel stiffness modulus is likely to form a soft gel system. A soft gel can control seepage type loss zones, but because soft gels cannot resist the stresses caused by fluids being pumped into the formation, a soft gel LCM will continue to move through the fractures and channels of moderate to severe loss zones without creating an effective flow barrier. If the gel LCM cannot seal the lost circulation zone effectively, it may not bring the mud loss below the maximum allowable limit. In some cases, the gel may not be capable of solidifying at all. Tests indicate that especially in vugular formations, conventional gel LCMs perform poorly.

Conventional gel LCMs usually have poor thermal stability, chemical stability, low gel stiffness modulus, low yield strength, and low tolerance for salt, making them unsuitable for some environments, e.g., marine, and thus have limited capacity in controlling loss of circulation, especially in highly fractured and cavernous formations.

In addition, the formulations of conventional gel LCMs require special preparation and handling. Special preparations can include the order in which the components are mixed, mixing techniques, or the need for specialized mixing units. If the formulation guidelines are not followed precisely, the conventional gel LCM may not obtain homogeneous gel characteristics. Careful handling implies the placement and pumping of the LCM into the formation. Conventional gel LCMs require precise placement in the formation due to the reaction kinetics of the polymers and cross-linkers. Proper placement ensures that the materials reach the proper gel characteristics at the target location. Proper placement in turn depends on the pumping schedule and the pumping units, which often must be highly specialized. In addition, drilling operations are usually stopped until the lost circulation zone is sealed and fluid losses to the formation are reduced to an acceptable level.

The requirements for preparation and placement mean that significant time can lapse between reaching lost circulation and beginning control measures with conventional gel-based LCMs. At a minimum, the time lapse translates to a substantial volume loss of drilling fluid. At worst, the extended preparation time may aggravate the problem, turning a manageable lost circulation problem into a situation in which lost circulation control is not possible and the entire well must be shut-down.

The industry needs an alternative lost circulation treatment that can be prepared quickly to control moderate to high mud losses. Beginning a lost control treatment process as soon as possible after the loss zone is encountered is desirable. A suitable alternative that overcomes the drawbacks of conventional gel LCMs to combat lost circulation and avoid the operational complexities associated with delayed lost circulation treatment is desirable.

A gel-based LCM that shows improved yield strength and gel stiffness modulus, and thus effectively mitigates mud loss, reduces volume of LCM pill, and meets environmental regulations is desired.

SUMMARY OF THE INVENTION

Embodiments of the invention generally relate to methods to control lost circulation in a lost circulation zone in a wellbore during continuous drilling with a drilling mud. More specifically, embodiments of the invention relate to methods for converting a drilling mud into a gel-based LCM composition during continuous drilling.

In one aspect of the present invention, a method to control lost circulation in a lost circulation zone in a wellbore during continuous drilling with a dual-purpose drilling mud is provided. The method including the steps of entering the lost circulation zone, the lost circulation zone being where a flow rate of the dual-purpose drilling mud that returns to a surface is less than a flow rate of the dual-purpose drilling mud pumped into the wellbore, wherein the dual-purpose drilling mud includes a volcanic ash, water, a de-foamer, a pH buffer, a viscosifier, and a fluid loss additive. The method further includes the steps of estimating a lost circulation volumetric flow rate, the lost circulation volumetric flow rate being defined as a difference between the flow rate of the dual-purpose drilling mud pumped into the wellbore and the flow rate of the dual-purpose drilling mud that returns to the surface, metering a first amount of a binder into the dual-purpose drilling mud to create a binder containing dual-purpose drilling mud, wherein the first amount of the binder metered is in a pre-selected range based on a target gel characteristic, such that the first amount of the binder metered is operable to achieve the target gel characteristic of the binder containing dual-purpose drilling mud, pumping the binder containing dual-purpose drilling mud into the wellbore, and suspending metering of the first amount of the binder to the dual-purpose drilling mud after a pre-defined regulating period of time, wherein the pre-defined regulating period of time is effective to permit the binder containing dual-purpose drilling mud to achieve the target gel characteristic to create a gel-based LCM for contact with the lost circulation zone, the gel-based LCM being operable to alter the lost circulation zone, such that the flow rate of the dual-purpose drilling mud that returns to the surface increases.

In certain aspects of the present invention, the method further includes the steps of estimating a second lost circulation volume, the second lost circulation volume being defined as a difference between the flow rate of the dual-purpose drilling mud pumped into the wellbore after the step of suspending metering of the first amount of the binder and the flow rate of the dual-purpose drilling mud that returns to the surface, metering a second amount of the binder into the dual-purpose drilling mud, wherein the second amount of the binder metered is in the pre-selected range based on the target gel characteristic, and suspending metering of the second amount of the binder. In certain aspects of the present invention, the method further includes the step of mixing the first amount of the binder with the dual-purpose drilling mud in a separate mixing step following the step of metering the first amount of the binder into the dual-purpose drilling mud. In certain aspects of the present invention, the volcanic ash is a Saudi Arabian volcanic ash. In certain aspects of the present invention, the pH buffer is selected from the group consisting of sodium hydroxide, potassium hydroxide, and lime. In certain aspects of the present invention, the viscosifier is XC polymer. In certain aspects of the present invention, the fluid loss control additive is psyllium husk powder. In certain aspects of the present invention, the binder is selected from the group consisting of drilling grade cements of Class A, Class B, Class C, Class G, Class H or combinations thereof. In certain aspects of the present invention, the pre-defined regulating period of time is between 30 minutes and 2 hours. In certain aspects of the present invention, a weight ratio of the volcanic ash to the binder is 1:1.5 to 1:3. In certain aspects of the present invention, the target gel characteristic is selected from the group consisting of a gel breaking strength, a gel stiffness modulus, a yield strength, and combinations thereof.

In a second aspect of the present invention, a gel-based LCM composition is provided. The gel-based LCM composition includes a volcanic ash, water, a viscosifier, a fluid loss control additive, a pH buffer, wherein the pH buffer is operable to adjust a pH of the gel-based LCM, a de-foamer, wherein the de-foamer is operable to reduce the creation of foam, and a binder, wherein the binder is operable to achieve the target gel characteristic of the gel-based LCM.

In certain aspects of the present invention, the volcanic ash is a Saudi Arabian volcanic ash. In certain aspects of the present invention, the pH buffer is selected from the group consisting of sodium hydroxide, potassium hydroxide, and lime. In certain aspects of the present invention, the viscosifier is XC polymer. In certain aspects of the present invention, the fluid loss control additive is psyllium husk powder. In certain aspects of the present invention, the binder is selected from the group consisting of drilling grade cements Class A, Class B, Class C, Class G, Class H or combinations thereof. In certain aspects of the present invention, a weight ratio of the volcanic ash to the binder is 1:1.5 to 1:3.

In a third aspect of the present invention, a method to control lost circulation in a lost circulation zone in a wellbore using a gel-based LCM is provided. The method includes the steps of mixing a gel-based LCM pill, the gel-based LCM pill including a volcanic ash, water, a viscosifier, a fluid loss control additive, a pH buffer, wherein the pH buffer is operable to adjust a pH, a de-foamer, wherein the de-foamer is operable to reduce the creation of foam, and a binder, wherein the gel-based LCM pill is operable to achieve a target gel characteristic to create the gel-based LCM, aligning an open end pipe in proximity to the lost circulation zone, the open end pipe configured to deliver the gel-based LCM pill to the lost circulation zone, and pumping the gel-based LCM pill through the open end pipe at a pill pump rate, wherein the pill pump rate is effective to position the gel-based LCM pill to create the gel-based LCM composition for contact with the lost circulation zone, the gel-based LCM being operable to alter the lost circulation zone.

In certain aspects of the present invention, the method further includes the steps of suspending pumping of a drilling fluid into the wellbore, wherein the step of suspending pumping occurs at a point in time prior to the step of pumping the gel-based LCM pill through the open end pipe, pumping a displacing mud into the open end pipe to displace the gel-based LCM pill from the open end pipe, wherein the step of pumping the displacing mud is effective to position the gel-based LCM pill in contact with the lost circulation zone, and shutting the wellbore for a gelling time, wherein the gelling time affords the gel-based LCM pill time to form the gel-based LCM. In certain aspects of the present invention, the volcanic ash is a Saudi Arabian volcanic ash. In certain aspects of the present invention, the pH buffer is selected from the group consisting of sodium hydroxide, potassium hydroxide, and lime. In certain aspects of the present invention, the viscosifier is XC polymer. In certain aspects of the present invention, the fluid loss control additive is psyllium husk powder. In certain aspects of the present invention, the binder is selected from the group consisting of drilling grade cements of Class A, Class B, Class C, Class G, Class H or combinations thereof. In certain aspects of the present invention, the gelling time is between 30 minutes and 2 hours. In certain aspects of the present invention, a weight ratio of the volcanic ash to the binder is 1:1.5 to 1:3.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1A:
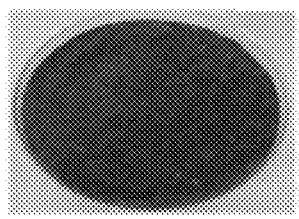
FIG. 1(a)-(f) are pictorial representations of the gel-based LCM during suspended weight method.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

A composition for a gel-based LCM to treat a lost circulation zone is herein provided. The gel-based LCM includes volcanic ash, water, a viscosifier, a fluid loss control additive, a binder, a pH buffer, and a defoamer. The viscosifier and fluid loss control additive surround the volcanic ash forming a soft coating on the volcanic ash particles. The binder is any cement operable to trigger inter-particle soft bonding, networking, and gelling of the volcanic ash, water, viscosifier, and fluid loss control additive to create the gel-based LCM. Without being bound to a specific theory, the water combines with the hydrophilic cement particles to form calcium silicate hydrate crystals. The calcium silicate hydrate crystals grow and extend through the surrounding water phase linking together with the soft-coated volcanic ash particles to form the gel, where the volcanic ash acts as a dispersed filler. The gel-based LCM is a flexible stiff gel network. The volcanic ash, viscosifier, and fluid loss control additive prevent the gel-based LCM from hardening beyond a flexible stiff gel network. In at least one embodiment of the present invention, the gel-based LCM is in the absence of a hard gel or solid.

In certain embodiments of the present invention, the volcanic ash is Saudi Arabian volcanic ash. In certain embodiments, the viscosifier is XC polymer. In certain embodiments, the fluid loss control additive is psyllium husk or psyllium husk powder. In certain embodiments, the binder is selected from the group consisting of drilling grade cements that are used to complete a well after making the borehole. In some embodiments, the cement is a Portland cement (i.e. a hydraulic cement). In some embodiments, the cement is a Portland Cement selected from Class A, Class B, Class C, Class, G, Class H, or combinations thereof. In at least one embodiment, the cement is a Class H cement. The pH buffer adjusts the pH of the drilling mud. A target pH reduces the corrosion effects on the subsurface tools. The target pH range is between about 8 and about 11, alternately between about 8.5 and about 10.5, and alternately between about 9 and about 10. In certain embodiments, the pH buffer is selected from the group consisting of sodium hydroxide, potassium hydroxide, and lime. In at least one embodiment, the pH buffer is sodium hydroxide. The de-foamer readily reduces the tendency of the drilling mud to foam. In at least one embodiment, the de-foamer is a brine. In at least one embodiments, the de-foamer is BARABRINE® defoam. BARABRINE® defoam is a liquid blend of nonionic surfactants.

In at least one embodiment of the present invention, the gel-based LCM includes Saudi Arabian volcanic ash, water, XC polymer, psyllium husk powder, Class H Portland cement, sodium hydroxide, and a de-foamer. In some embodiments of the present invention, the drilling mud used in the method of the present invention includes volcanic ash, water, a pH buffer, de-foamer, a viscosifier, a fluid loss control additive, and a binder.

In at least one embodiment of the present invention, the composition of the gel-based LCM is formulated to achieve a target gel characteristic in the lost circulation zone. Exemplary target gel characteristics include a gel breaking strength (lb/100 ft$^2$), a gel stiffness modulus (lbf/mm), a yield strength (lbf), and combinations thereof. The gel breaking strength indicates the load suspension capability of a gel-based LCM. Load suspension capability is a marker of the ability of a gel-based LCM to affect a lost circulation zone. The higher the gel breaking strength, the higher the load suspension capability and the more likely the gel-based LCM is capable of altering a massive lost circulation zone. The gel stiffness modulus is indicative of the resistance of a gel to flow when subjected to a moving force. In a wellbore, the gel stiffness modulus indicates the gel resistance to flow while being squeezed into the lost circulation zone. The higher the gel stiffness modulus, the greater the resistance to flow in the fractures and permeable channels, leading to partial or complete blockage of the lost circulation zone. The yield strength indicates the force necessary to initiate flow of the gel associated with plastic deformation. The higher the yield strength of a gel-based LCM, the greater resistance to flow of the gel-based LCM in the fractures and permeable channels of the wellbore, while the gel is forced into a lost circulation zone. Resistance to flow translates to a composition that will readily solidify within the lost circulation zone. The solidified gel-based LCM creates an effective flow barrier to stop fluid/mud losses in the lost circulation zone.

The target gel characteristic is determined based on the nature of the lost circulation zone. Without being bound to a particular theory, the weight ratio of the volcanic ash to the binder governs the target gel characteristic in the gel-based LCM, making both the presence of the binder and the concentration of the binder critical to achieving the target gel characteristic. The weight ratio of the volcanic ash to the binder is in the range from about 1:0.5 to about 1:5, alternately from about 1:1 to about 1:5, and alternately from about 1:1.5 to about 1:3.

Methods to use the gel-based LCM to control lost circulation in the lost circulation zone in the wellbore are provided.

Embodiments Related to a Continuous Drilling Method for Delivering the Gel-Based LCM A continuous drilling method to control lost circulation in the lost circulation zone in the wellbore during continuous drilling with the dual-purpose drilling mud is provided. The continuous drilling method occurs during the course of continuous drilling with the dual-purpose drilling mud from a surface down the wellbore. The term "dual-purpose drilling mud" as used herein signifies a fluid that can be used for two purposes, that is, the fluid is useful as a drilling fluid and as a component of a lost circulation material as will be described herein.

As the wellbore is drilled, dual-purpose drilling mud is continuously pumped into the wellbore to clear and clean the wellbore and the filings. The dual-purpose drilling mud is pumped from a mud pit into the wellbore and returns again to the surface. In some embodiments of the present invention, the dual-purpose drilling mud that returns to the surface is cleaned prior to being returned to the mud pit. The dual-purpose drilling mud includes volcanic ash, water, a viscosifier, a fluid loss control additive, a pH buffer, and de-foamer.

Drilling proceeds until a lost circulation zone is encountered. A lost circulation zone is encountered when the flow rate of the dual-purpose drilling mud that returns to the surface is less than the flow rate of the dual-purpose drilling mud pumped into the wellbore.

The lost circulation zone is characterized by estimating the lost circulation volumetric flow rate. The lost circulation volumetric flow rate is the rate at which the dual-purpose drilling mud is lost in the lost circulation zone. In at least one embodiment of the present invention, the lost circulation volumetric flow rate is estimated based on the drop of level in a mud tank. The mud tank is the point of origin and return for the dual-purpose drilling mud. In at least one embodiment of the present invention, the lost circulation volumetric flow rate is estimated based on the difference between the flow rate of the dual-purpose drilling mud pumped into the wellbore and the flow rate of the dual-purpose drilling mud that returns to the surface. "Estimate" or variations thereof, as used herein, includes determining or calculating the lost circulation volumetric flow rate, estimates are appropriate because the exact lost circulation volumetric flow rate is not required to proceed with the method of the present invention. Any methods for estimating the flow rate of the dual-purpose drilling mud pumped into the wellbore and the flow rate of the dual-purpose drilling mud that returns to the surface is appropriate. In at least one embodiment of the present invention, flow meters are used to estimate the flow rates.

The lost circulation volumetric flow rate is any value greater than zero (0) but less than the flow rate of the dual-purpose drilling mud pumped into the wellbore. In at least one embodiment of the present invention, the lost circulation volumetric flow rate is any value greater than 10 bbls/hr but less than the flow rate of the dual-purpose drilling mud pumped into the wellbore. A loss of 10 bbl/hr of the dual-purpose drilling mud is expected due to adherence to rock cuttings and small increases in hole volume. The lost circulation volumetric flow rate is analyzed to identify the nature of the lost circulation zone. The larger the lost circulation volumetric flow rate the larger the lost circulation zone. The lost circulation zone can be a seepage type lost circulation zone, a moderate type lost circulation zone, a severe lost circulation zone, or any other type known to one of skill in the art. For example, a lost circulation volumetric flow rate near to the flow rate of the dual-purpose drilling mud pumped into the wellbore indicates a large lost circulation zone. In some instances, the lost circulation volumetric flow rate may approximate the flow rate of the dual-purpose drilling mud pumped into the wellbore indicating a massive lost circulation zone.

In at least one embodiment of the present invention, the dual-purpose drilling mud is continuously pumped into the wellbore after a lost circulation zone is encountered.

Understanding the nature of the lost circulation zone provides information helpful to estimating the first amount of the binder to be added to the dual-purpose drilling mud to create the gel-based LCM for controlling the lost circulation volumetric flow rate in the lost circulation zone. The addition of the first amount of the binder to the dual-purpose drilling mud creates a binder containing dual-purpose drilling mud. The gel-based LCM is created when the binder containing dual-purpose drilling mud achieves the target gel characteristic.

The first amount of the binder can be determined based on considerations of the flow rate of the dual-purpose drilling mud pumped into the wellbore, the distance to the lost circulation zone, the lost circulation volumetric flow rate, the nature of the lost circulation zone, and the target gel characteristic.

In at least one embodiment of the present invention, the first amount of the binder is selected from a pre-selected range. The pre-selected range is a function of the amount of volcanic ash in the dual-purpose drilling mud such that the pre-selected range encompasses the weight ratio of the volcanic ash to binder needed to achieve the target gel characteristic.

In at least one embodiment of the present invention, the first amount of the binder is determined from estimating a gel-based LCM volume. The gel-based LCM volume is estimated by multiplying the lost circulation volumetric flow rate by the lost time. The lost time is any unit of time, such that multiplying the lost circulation volumetric flow rate by the lost time will result in a volume. The lost time can be about 30 minutes, alternately greater than about 30 minutes, alternately about one hour, alternately about two hours, alternately about three hours, alternately about four hours, alternately between about 2 and about 5 hours, and alternately by more than about 5 hours. The lost time is selected in consideration of the nature of the lost circulation zone, where a higher lost time value is used for more severe lost circulation zones. In at least one embodiment of the present invention, a time above two hours will be selected for a lost circulation of a moderate type or severe type lost circulation zone. The amount of binder is selected to produce the gel-based LCM volume as estimated. In some embodiments of the present invention, multiplying the lost circulation volumetric flow rate by the lost time provides a gel-based LCM volume that is greater than the volume of dual-purpose drilling mud lost in one hour at the lost circulation volumetric flow rate lost.

In an alternate embodiment of the present invention, the first amount of the binder is selected in consideration of the target gel characteristic, such that the binder containing dual-purpose drilling mud achieves the target gel characteristic during contact with the lost circulation zone. One of skill in the art will appreciate that if the target gel characteristic is achieved at a distance from the surface but before entering the lost circulation zone, then the binder containing dual-purpose drilling mud might gel up in the wellbore causing no dual-purpose drilling mud to reach the lost circulation zone. Conversely, if the target gel characteristic is achieved at a distance from the surface but after entering the lost circulation zone, then the binder containing dual-purpose drilling mud will gel outside of the lost circulation zone and have minimal effect on lost circulation. The first amount of the binder is established based on the composition of the dual-purpose drilling mud prior to addition of the binder, such that the desired weight ratio of the volcanic ash to the binder is achieved.

The first amount of the binder is then metered into the dual-purpose drilling mud to create the binder containing dual-purpose drilling mud, as the dual-purpose drilling mud is continuously being pumped into the wellbore. "Metering," as used herein, means that the first amount of the binder is added to the dual-purpose drilling mud over time and not as a batch addition. The rate at which the binder is metered into the dual-purpose drilling mud is commensurate with the need to achieve the target gel characteristic in the lost circulation zone. Considerations of the flow rate of the dual-purpose drilling mud pumped into the wellbore, the distance to the lost circulation zone, and the target gel characteristic.

The binder containing dual-purpose drilling mud is pumped into the wellbore. The pump used in the pumping step is the same pump that is used to pump the dual-purpose drilling mud into the wellbore prior to entering the lost circulation zone. In at least one embodiment of the present invention, the pumping step is concurrent with the metering step.

After the pre-defined regulating period of time, metering of the first amount of the binder into the dual-purpose drilling mud is suspended. The pre-defined regulating period of time ensures that binder containing dual-purpose drilling mud reaches the lost circulation zone and achieves the target gel characteristic at the lost circulation zone to reduce the first lost circulation volume. The pre-defined regulating period of time is between about 30 minutes and 6 hours, alternately between 1 hour and 5 hours, alternately between 2 hours and 4 hours, alternately between 30 minutes and 2 hours, alternately between 3 hours and 6 hours, alternately greater than 6 hours. The pre-defined regulating period of time is effective to permit the binder containing dual-purpose drilling mud to achieve the target gel characteristic to create the gel-based LCM in the wellbore in the lost circulation zone.

After the binder containing dual-purpose drilling mud reaches the lost circulation zone, pumping is suspended for a setting time. The setting time is between 30 minutes and 3 hours, alternately between 1 hour and 2 hours.

The gel-based LCM is operable to alter the lost circulation zone, such that the lost circulation volumetric flow rate is reduced and the flow rate of the dual-purpose drilling mud returned to the surface increases. "Alter," as used herein, means that the lost circulation zone and the lost circulation volumetric flow rate is reduced, minimized, or eliminated. The gel-based LCM gels at the lost circulation zone creating a blockage or plug which prevents the dual-purpose drilling mud from leaving the wellbore. In at least one embodiment of the present invention, the gel-based LCM plugs off a portion of the lost circulation zone. In one embodiment of the present invention, the gel-based LCM plugs off the entire lost circulation zone, the flow rate to the surface resumes or reaches a level equivalent to or nearly equivalent to the flow rate being pumped into the wellbore.

In certain embodiments, the method of the present invention includes the second lost circulation step occurring after suspension of the metering of the first amount of the binder. The second lost circulation volumetric flow rate is determined by estimation. The second lost circulation volumetric flow rate is estimated based on the difference between the flow rate of the dual-purpose drilling mud pumped into the wellbore and the flow rate of the dual-purpose drilling mud that returns to the surface. The second lost circulation volumetric flow rate is any value greater than zero (0) but less than the flow rate of the dual-purpose drilling mud pumped into the wellbore. In at least one embodiment of the present invention, the lost circulation volumetric flow rate is any value greater than 10 bbls/hr but less than the flow rate of the dual-purpose drilling mud pumped into the wellbore. A loss of 10 bbl/hr of the dual-purpose drilling mud is expected due to adherence to rock cuttings and small increases in hole volume. In some embodiments, the second lost circulation volumetric flow rate will be less than the lost circulation volumetric flow rate. In at least one embodiment, the second lost circulation volume will be greater than the lost circulation volumetric flow rate. The second lost circulation step is necessary when the lost circulation zone is still considered to be large as determined by an estimate of the lost circulation volumetric flow rate and the nature of the lost circulation zone as determined herein.

In the second metering step, a second amount of the binder is metered into the dual-purpose drilling mud. The second amount of the binder is determined as described above with reference to the first amount of the binder. The second amount of the binder is metered into the dual-purpose drilling mud while the dual-purpose drilling mud is continuously pumped into the wellbore as described above with reference to metering the first amount of the binder. After the pre-defined regulating period of time, the metering of the second amount of the binder is suspended.

In at least one embodiment of the present invention, the continuous drilling method to control lost circulation in the lost circulation zone in the wellbore during continuous drilling with the dual-purpose drilling mud can be repeated until the lost circulation zone is altered by the gel-based LCM.

In an alternative embodiment of the present invention, the method includes a mixing step. In the mixing step, the binder is mixed with the dual-purpose drilling mud following the metering step. The mixing step can occur in any mixer capable of mixing the dual-purpose drilling mud and the first amount of the binder. In one embodiment of the present invention, the mixing step occurs in a mixer downstream of the mud pit, but upstream of the pump that pumps the dual-purpose drilling mud or binder containing dual-purpose drilling mud into the wellbore.

In some embodiments of the present invention, the dual-purpose drilling mud of the method is created by mixing volcanic ash, water, the de-foamer, the pH buffer, the viscosifier, and the fluid loss control additive to create the dual-purpose drilling mud. The dual-purpose drilling mud is configured to be pumped into the wellbore. The step to create the binder containing dual-purpose drilling mud includes adding the binder to the dual-purpose drilling mud at the drilling site during continuous pumping of the dual-purpose drilling mud into the wellbore.

The gel-based LCM that has achieved target gel characteristics is unsuitable for use as a dual-purpose drilling mud. The dual-purpose drilling mud of the present invention is formulated to react with the binder to achieve the gel-based LCM. The binder containing dual-purpose drilling mud is in the absence of solidified dual-purpose drilling mud.

Embodiments Related to a Pill-Based Method for Delivering the Gel-Based LCM

A pill-based method for altering the lost circulation volumetric flow rate in a lost circulation zone is provided. In the pill-based method of the present invention, a gel-based LCM pill is introduced to the lost circulation zone to alter the lost circulation volumetric flow rate, wherein the gel-based LCM is created when the gel-based LCM pill achieves the target gel characteristic. The pill-based method of the present invention can be used to control the lost circulation volumetric flow rate regardless of the drilling fluid being used to drill the wellbore.

During the drilling stage, drilling fluid is pumped into the wellbore until the lost circulation zone is entered. In at least one embodiment of the pill-based method, the drilling fluid is in the absence of the dual-purpose drilling mud. As described herein, the lost circulation zone is entered when the flow rate of the drilling fluid that returns to the surface is less than the flow rate of the drilling fluid pumped into the wellbore.

Once a lost circulation zone is entered, the lost circulation volumetric flow rate is estimated. The lost circulation volumetric flow rate is estimated based on the difference between the flow rate of the drilling fluid pumped into the wellbore and the flow rate of the drilling fluid that returns to the surface as described herein. The lost circulation volumetric flow rate is analyzed to identify the nature of the lost circulation zone as described herein. The nature of the lost circulation zone allows one to estimate the lost time as described herein. The volume of the gel-based LCM pill is estimated by multiplying the lost time by the lost circulation volumetric flow rate. The volume of the gel-based LCM pill is an estimate of the volume of the gel-based LCM expected to be required to alter the lost circulation volumetric flow rate.

The gel-based LCM pill is produced by mixing the volcanic ash, the water, the viscosifier, the fluid loss control additive, the pH buffer, the defoamer, and the binder. The gel-based LCM pill is produced by mixing the components in the quantities to achieve the volume estimated. The quantity of each component, including the amount of binder, is selected based on the target gel characteristic, the distance to the lost circulation zone, the lost circulation volumetric flow rate, and the nature of the lost circulation zone. In at least one embodiment, the volcanic ash, the water, the viscosifier, the fluid loss control additive, the pH buffer, and the defoamer are pre-mixed, that is the components are mixed prior to such as time as entering a lost circulation zone. The gel-based LCM pill can be mixed in any mixing vessel suitable for mixing a pill to be delivered downhole. In at least one embodiment of the present invention, the gel-based LCM is mixed in a hopper connected by valve to the open end pipe.

The drilling stage is suspended after entering the lost circulation zone. Suspension of the drilling stage can occur as soon as the lost circulation zone is entered, while the gel-based LCM pill is being mixed, or after the gel-based LCM pill is mixed.

Delivery of the gel-based LCM pill is facilitated by the open end pipe. The open end pipe is aligned between the surface and the lost circulation zone in proximity to the lost circulation zone. The open end pipe can be any kind of downhole pipe capable of deliver the gel-based LCM to the lost circulation zone. In at least one embodiment of the present invention, the drill bit is retracted to a position between the surface and the lost circulation zone.

Once the open end pipe is placed, the gel-based LCM pill is pumped at the pill pump rate. The pill pump rate delivers the gel-based LCM pill to the lost circulation zone at a rate to avoid the gel-based LCM pill achieving the target gel characteristic in the open ended pipe. The pill pump rate is greater than 10 bbl/min, alternately between about 0.5 bbl/min and about 10 bbl/min, alternately between about 1 bbl/min and about 5 bbl/min, and alternately between about 2 bbl/min and about 3 bbl/min. In at least one embodiment of the present invention, the pill pump rate is pre-determined prior to entering a lost circulation zone.

After the entire volume of the gel-based LCM pill has been pumped into the open end pipe, the displacing mud is pumped into the open end pipe at the displacement rate. The displacement rate displaces the gel-based LCM pill from the open end pipe, so that the gel-based LCM pill is placed in the lost circulation zone when it achieves the target gel characteristic. In at least one embodiment of the present invention, the displacement rate is pre-determined prior to entering the lost circulation zone. The displacement rate can be determined based on the pill pump rate, the length of the open end drill pipe, and the displacing mud.

Once the displacement mud displaces the gel-based LCM pill from the open end pipe, the wellbore is shut for the gelling time. The gelling time affords the gel-based LCM pill time to achieve the target gel characteristic to form the gel-based LCM in the lost circulation zone. In at least one embodiment of the present invention, the gelling time is determined based on the amount of binder in the volume of the gel-based LCM pill and the nature of the lost circulation zone. An exemplary gelling time is between 30 minutes and 5 hours, between 1 hour and 4 hours, between 2 hours and 3 hours. In at least one embodiment of the present invention, the gelling time is 2 hours.

At the end of the gelling time, the wellbore is opened and the drilling fluid is pumped into the open end drill pipe. The return rate of drilling fluid can be measured and a lost circulation volumetric flow rate can be determined. If the lost circulation volumetric flow rate is greater than zero, the gel-based LCM pill based method for altering a lost circulation zone is repeated. In at least one embodiment of the present invention, if the lost circulation volumetric flow rate is greater than 10 bbls/hr, the gel-based LCM pill based method for altering a lost circulation zone is repeated. In at least one embodiment of the present invention, drilling fluid is pumped into the wellbore and a pressure of the wellbore is measured. When the measured pressure is maintained for a period of time, normal operations commence. If the measured pressure is not maintained for a period of time, the gel-based LCM pill-based method is repeated.

EXAMPLES

Example 1

In example 1, three different samples of the gel-based LCM were created, Table 1. The volcanic ash was a Saudi Arabian volcanic ash (SAVA). The viscosifier was XC polymer. The viscosifier was a pysllium husk powder (PHP). The pH buffer was sodium hydroxide. The de-foamer was BARABRINE® defoam. The binder was a class H cement. Each sample contained a different amount of the binder added to a prepared dual-purpose drilling mud. Each sample was mixed for 20 minutes using a variable speed Hamilton Beach mixer. A standard rotational viscometer was used to measure the rheological and gel strength properties of the resulting gel-based LCM sample, Table 2. The rotational viscometer readings were taken at room temperature and atmospheric pressure. The rotational viscometer was used to assess the inter-particle bond strength of the mixture after aging periods of 10 minutes, 1 hour, and 2 hours (Table 3). After the two hour aging period, a suspended weight test was performed as a second comparative evaluation of gel stiffness, see FIG. 1. Discs were placed onto samples of the gel-based LCM and were observed to determine the ability of the gel to suspend the weight. Discs weighing between 100 and 500 grams were used.

TABLE 1

Composition of the Samples

| Components | SAMPLE 1 | SAMPLE 2 | SAMPLE 3 |
|---|---|---|---|
| Water (ml) | 350 | 350 | 350 |
| SAVA-I (g) | 20 | 20 | 20 |
| XC Polymer (g) | 3 | 3 | 3 |
| PHP 95 (g) | 3 | 3 | 3 |
| NaOH (ml) | as required to raise pH 10 | as required to raise pH 10 | as required to raise pH 10 |
| De-Foamer (cc) | as required | as required | as required |
| Cement (g) | 0 | 30 | 60 |

TABLE 2

Dial Readings and Gel Strength of Sample 1

| Rotational Speed (rpm) | | | | | | Gel Strength | |
|---|---|---|---|---|---|---|---|
| 600 | 300 | 200 | 100 | 6 | 3 | 10 Seconds Gel Strength | 10 Minutes Gel Strength |
| Dial Reading | | | | | | lbs/100 ft$^2$ | lbs/100 ft$^2$ |
| 67.8 | 59 | 56.7 | 50 | 32 | 31 | 29.8 | 33.6 |

TABLE 3

Gel Breaking Strength

| Sample | Gel Breaking Force (Lbs/100 ft$^2$) | | |
|---|---|---|---|
| Aging Time | SAMPLE 1 | SAMPLE 2 | SAMPLE 3 |
| 10 Seconds Static Aging | 29.8 | 31.1 | 36.7 |
| 1 Hour Static Aging | 30.3 | 105.4 | 124.6 |
| 2 Hour Static Aging | 31.7 | 142 | Beyond Measurable Range |

Results

Sample 1 represented a composition of the dual-purpose drilling mud without the binder. The results in Table 2 indicate that Sample 1 is suitable for use as the dual-purpose drilling mud because of the flat gel properties make for good cuttings suspension. The results also indicate weak inter-particle bonds easily breakable by an external force. During the suspended weight test, the 100 gram disc sank immediately into the dual-purpose drilling mud, after placement of the disc on top of the mud as shown in FIG. 1(a). The suspended weight test confirms that the dual-purpose drilling mud has poor structural rigidity and is not a well gelled mud system.

Figure 1B:
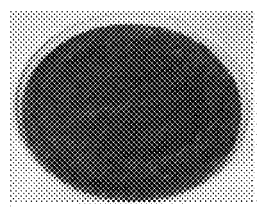
Figure 1C:
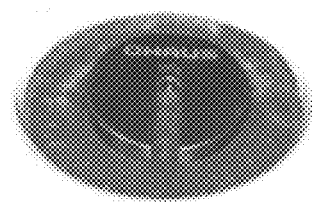
Figure 1D:
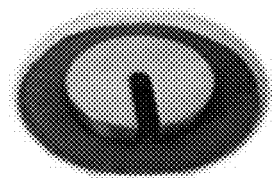
Figure 1E:
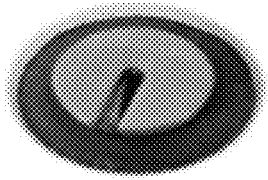
Figure 1F:
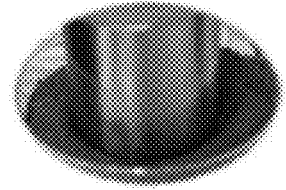
Figure 2:
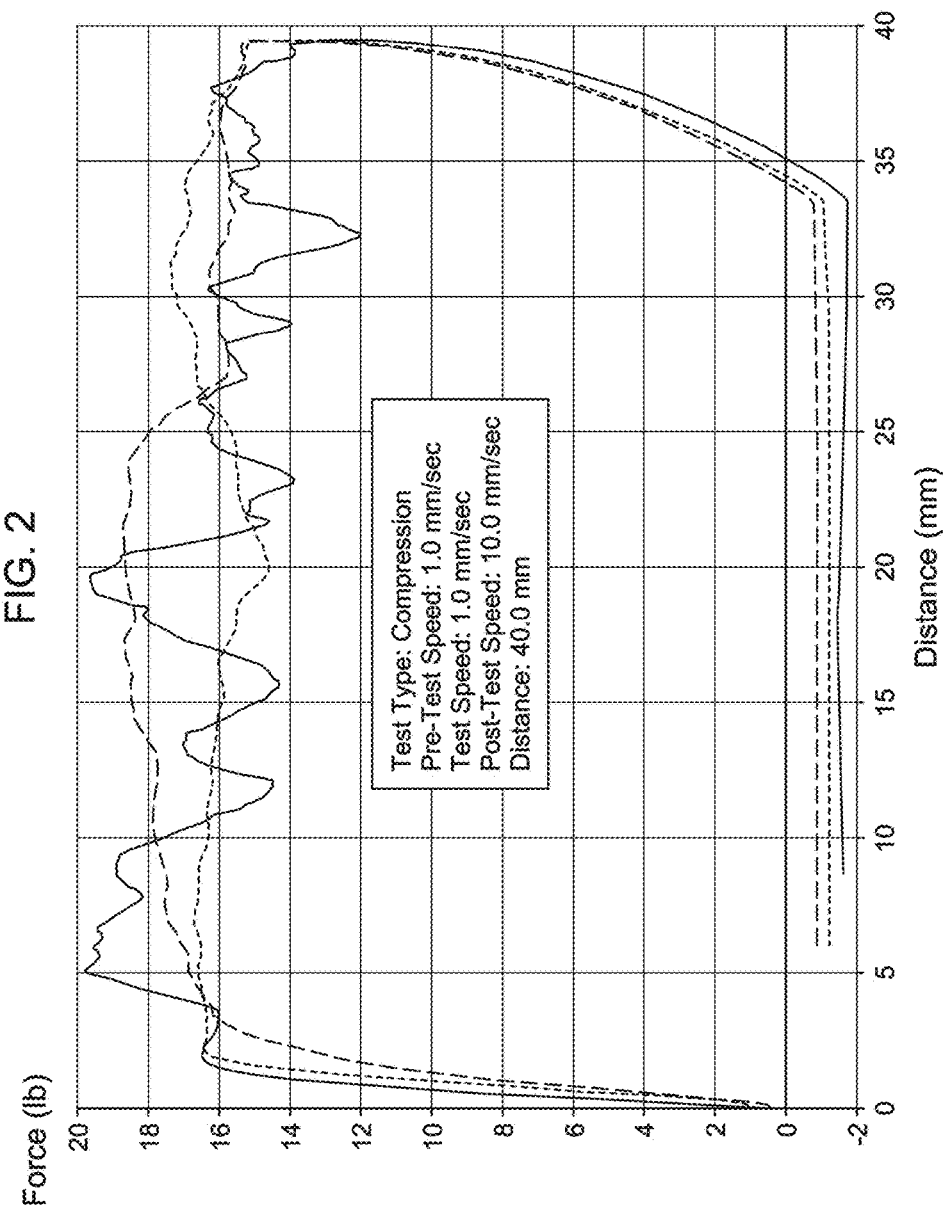
FIG. 2 is a compression versus displacement curve for a gel-based LCM sample.
Figure 3:
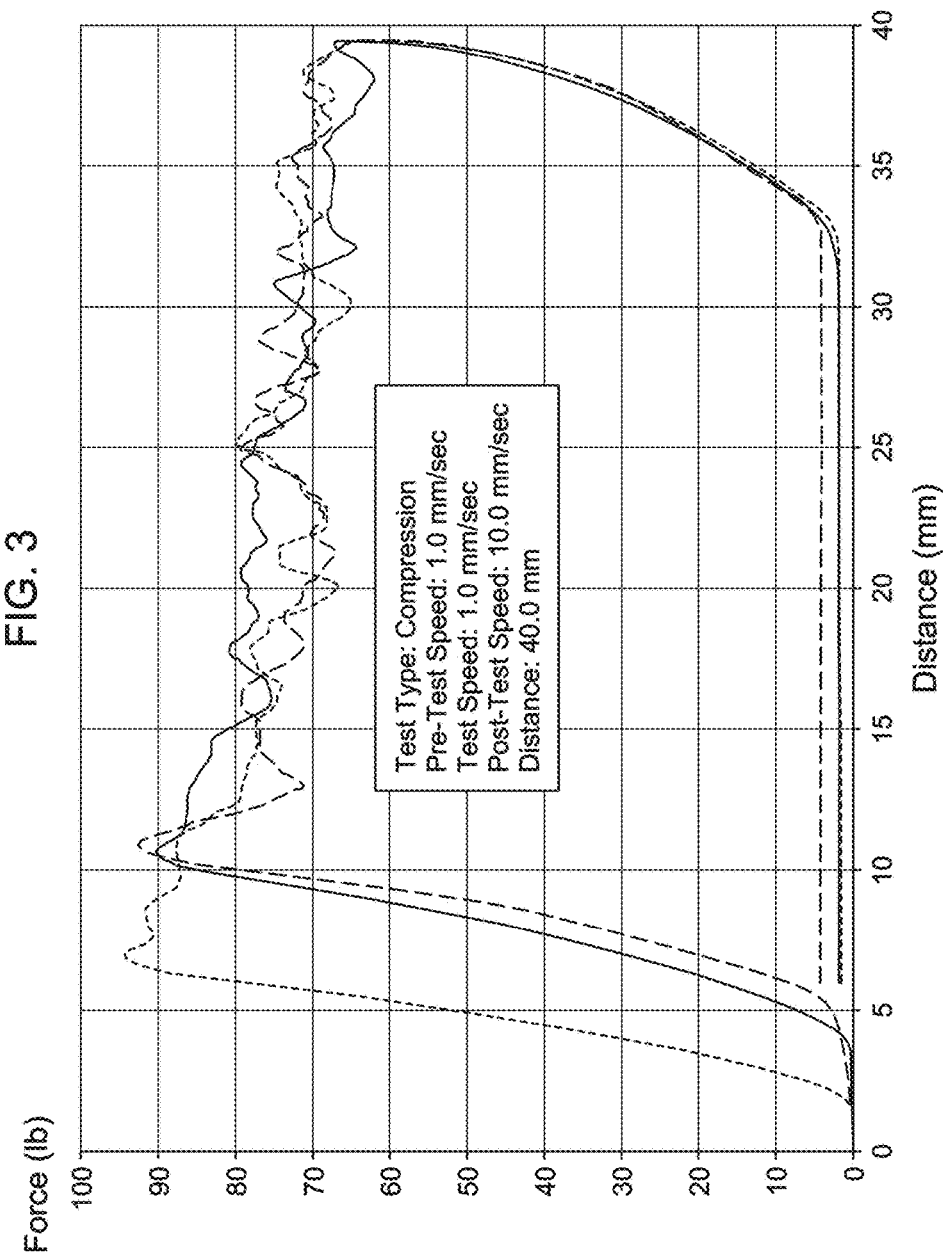
FIG. 3 is a compression versus displacement curve for a gel-based LCM sample.
Figure 4:
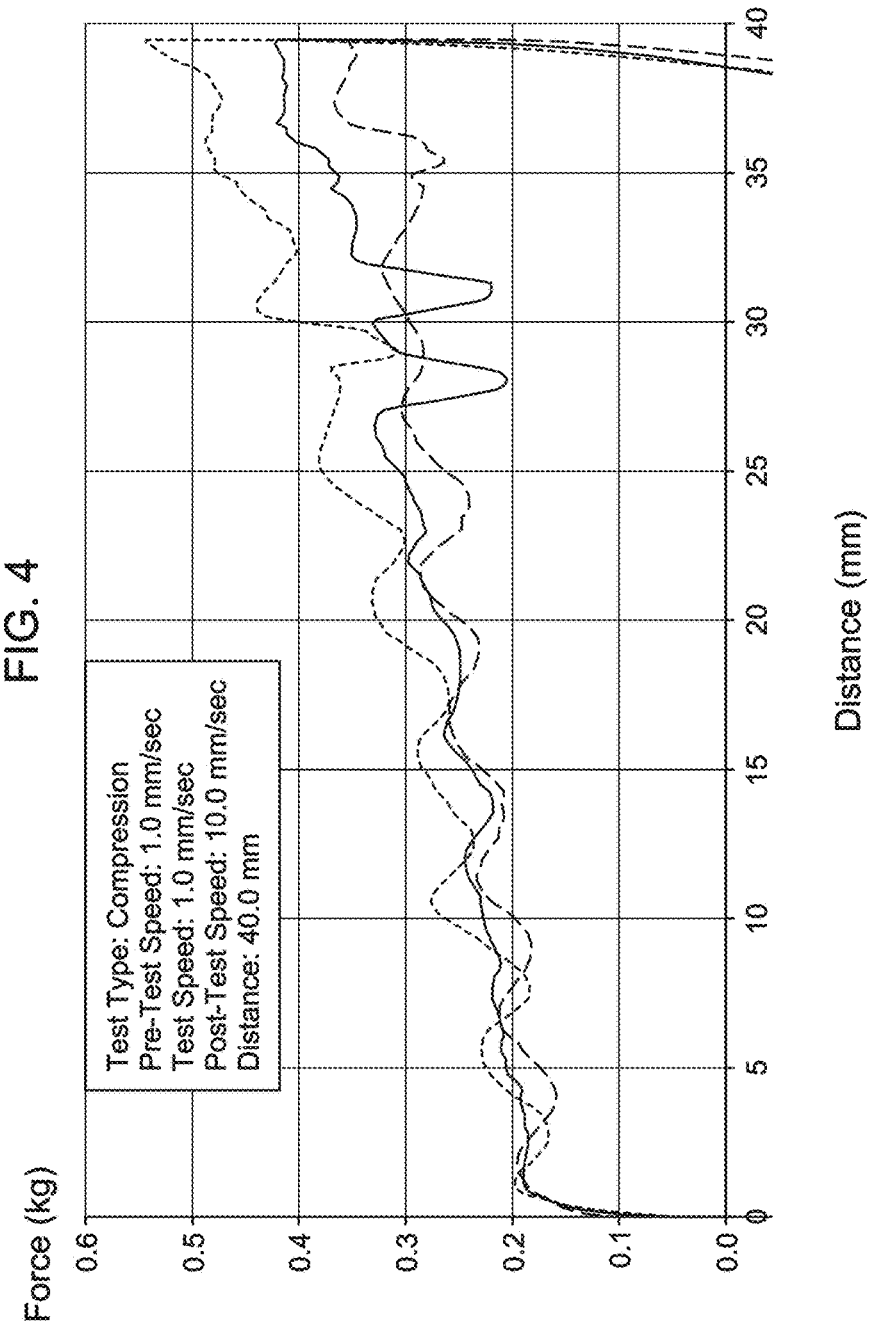
FIG. 4 is a compression versus displacement curve for a conventional lost circulation material sample.
Figure 5:
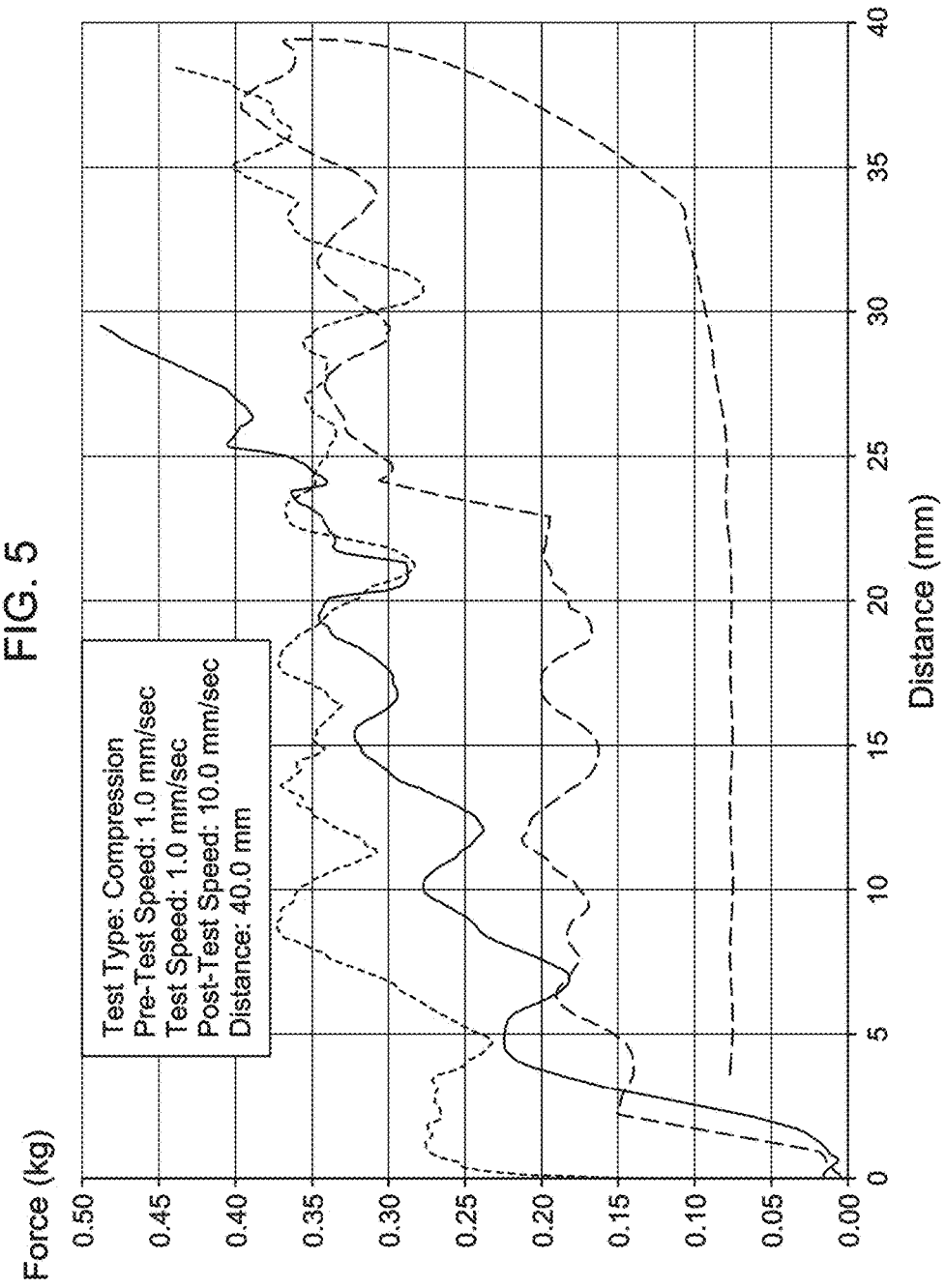
FIG. 5 is a compression versus displacement curve for a conventional lost circulation material sample.

The composition of Sample 2 with the binder produces the binder containing dual-purpose drilling mud. Table 3 shows that the addition of the binder converts the dual-purpose drilling mud to a gel-based LCM and provides values for a target gel characteristic of the gel breaking strength. When compared to Sample 1, Sample 2 shows enhanced gel breaking strength with increasing aging time. The suspended weight test confirmed that the gel-based LCM exhibited a gel stiffness greater than the dual-purpose drilling mud. When the 100 gram disc was placed on Sample 2, the disc sank more slowly than it had during the test of Sample 1 as shown in FIG. 1(b). The disc still sank, suggesting that while some inter-particle bonds had been created, the Sample 2 gel-based LCM was not a well gelled mud system with low load suspension capability due to insufficient target gel characteristics.

Sample 3 is an example of a composition useful to produce a gel-based LCM. Table 3 shows that when compared to Samples 1 and 2, Sample 3 exhibited enhanced gel breaking strength with increasing aging time. After 2 hours of aging, the rotational viscometer was unable to measure the gel breaking strength of Sample 3 because the gel breaking strength was beyond the measurement range of the rotational viscometer. It is suspected that Sample 3 developed strong inter-particle bonds in the gel system during the aging period thus producing the gel-based LCM. During the suspended weight test, the 100 gram disc did not sink into Sample 3, see FIG. 1(c). Then, 200, 300, and 500 gram discs were placed on top of Sample 3, see FIGS. 1(d), (e), and (f). Again, the 200 and 300 gram discs did not appreciably sink into Sample 3. Even the 500 gram disc did not fully sink into Sample 3. Sample 3 shows significant load suspension capability, indicating effective conversion of the dual-purpose drilling mud to a gel-based LCM.

The data for samples 2 and 3 indicate highly progressive target gel characteristics for a gel-based LCM.

Example 2

In Example 2, samples of the gel-based LCM and samples of conventional LCMs were subjected to compression tests for comparison. The components and composition for each sample are shown in Table 4. The conventional LCMs, samples G and H, were prepared using two different commercially available water soluble polymers ZND-2 and ZND-6. To prepare the samples, the components of each sample were mixed together for 20 minutes using a variable speed (rpm) Hamilton Beach mixer. The samples were cured for two hours in a closed container to allow time for inter-particle bonding, networking, and gel stiffening. The compression tests were performed using a test cell that included a perforated disc connected to a computer and program that displayed the results electronically. The test cell ensured the same volume of sample was used in each compression test. All the samples were tested under the same conditions, compression test type with a pre-test speed of 1.0 mm/sec, a test speed of 1.0 mm/sec, a post-test speed of 10.0 mm/sec and a distance of 40 mm. The test speed is a measure of the flat foot disc displacement that was used to push the top of the samples resting in the test cell. For each sample, three runs were performed to determine an average value for each sample.

The results were displayed graphically as a plot of displacement (mm) versus compression force (lb). The plots were then used to determine the target gel characteristics of gel stiffness modulus and the yield strength of the samples. The gel stiffness modulus is the slope of the intermediate part of the rising flanks of the curve, i.e., the intermediate linear part of the curve. The yield strength is the compression force (the peak of the curve) at which flow of the sample was initiated through the perforations of the bottom disc of the test cell. FIGS. 2-5 contain the graphical results in a plot of displacement (mm) versus compression force. Table 5 contains the gel stiffness modulus and the yield strength for each sample, including the average.

TABLE 4

Composition of the Samples

| Components | SAMPLE E | SAMPLE F | SAMPLE G | SAMPLE H |
|---|---|---|---|---|
| Water (ml) | 350 | 350 | 345.8 | 345.8 |
| SAVA-I (g) | 20 | 20 | — | — |
| XC Polymer (g) | 3 | 3 | — | — |
| PHP 95 (g) | 3 | 3 | — | — |
| NaOH (ml) | as required to raise pH 10 | as required to raise pH 10 | — | — |
| De-Foamer (cc) | as required | as required | — | — |
| Cement | 30 | 60 | — | — |
| Water Soluble Polymer (g) | — | — | 4.2 (ZND-2) | 4.2 (ZND-6) |

TABLE 5

Experimentally Determined Gel Stiffness Modulus and Yield Strength

| LCM Systems | Gel Stiffness Module (lbf/mm) | Yield Strength (lbf) |
|---|---|---|
| Sample E, Run 1 | 8.461 | 17.561 |
| Sample E, Run 2 | 11.63 | 16.501 |
| Sample E, Run 3 | 11.46 | 16.46 |
| Sample E Average | 10.52 | 16.84 |
| Sample F, Run 1 | 28.602 | 94.26 |
| Sample F, Run 2 | 27.414 | 92.538 |
| Sample F, Run 3 | 21.934 | 90.187 |
| Sample F Average | 25.98 | 92.33 |
| Sample G, Run 1 | 0.123 | 0.423 |
| Sample G, Run 2 | 0.111 | 0.434 |
| Sample G, Run 3 | 0.196 | 0.439 |
| Sample G Average | 0.143 | 0.432 |
| Sample H, Run 1 | 0.213 | 0.496 |
| Sample H, Run 2 | 0.231 | 0.332 |
| Sample H, Run 3 | 0.233 | 0.609 |
| Sample H Average | 0.226 | 0.479 |

Figure 6:
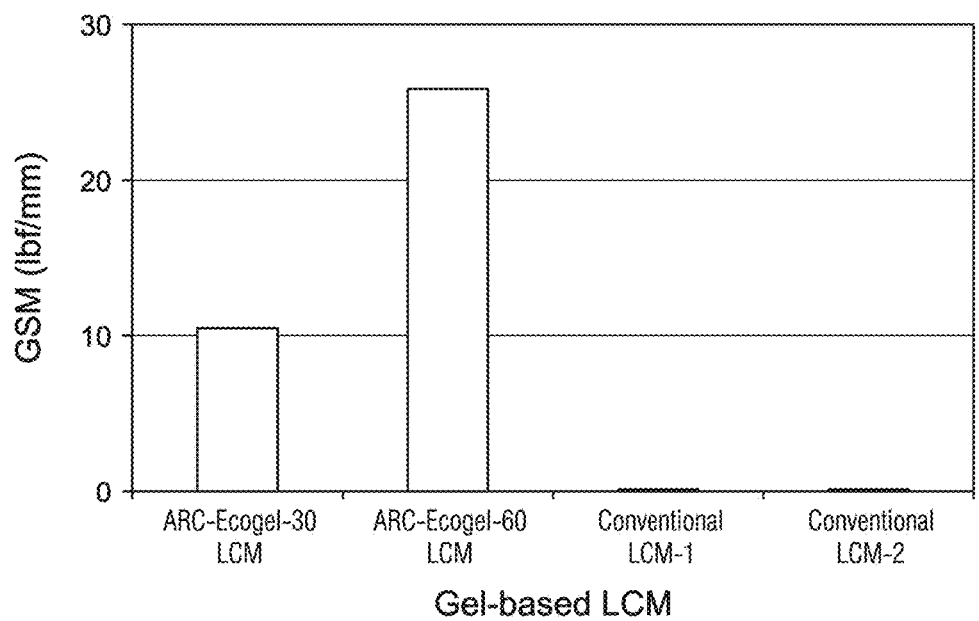
FIG. 6 is a comparison of the gel stiffness modulus between the samples of the gel-based LCM and the conventional lost circulation material samples.

FIG. 6 is a graphical comparison of the average gel stiffness modulus for each of the samples. The average data indicate that the average gel stiffness modulus of Sample E was more than 7000% higher than the average gel stiffness modulus of Sample G and more than 4000% higher than Sample H. The average data indicate that the average gel stiffness modulus of Sample F was more than 18000% higher than the average gel stiffness modulus value of Sample G and more than 11000% higher than Sample H. The high gel stiffness modulus of Samples F and G indicate that Samples F and G offer greater resistance to flow than Samples G and H. The greater resistance to flow means that the composition of samples F and G, the gel-based LCM of the present invention, provides a better solution for moderate type to severe type lost circulation.

Figure 7:
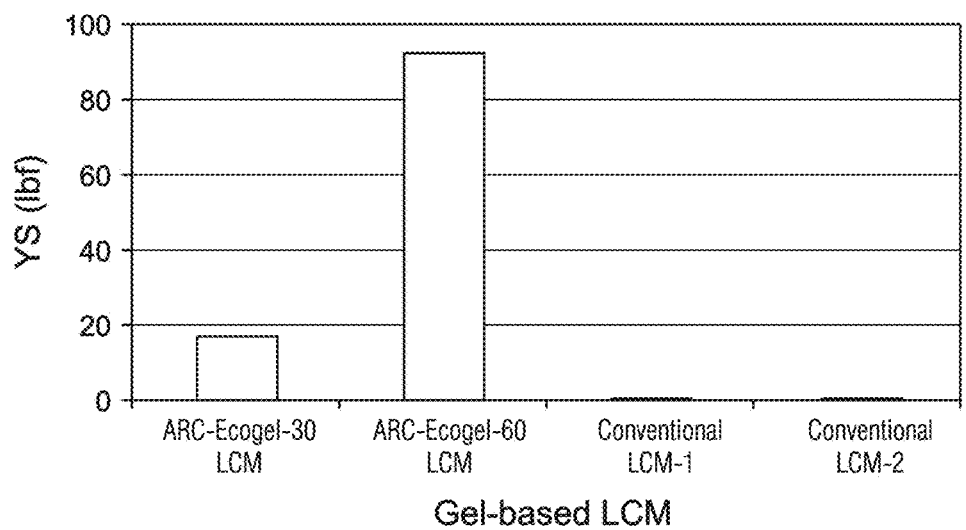
FIG. 7 is a comparison of the yield strength between the samples of the gel-based LCM and the conventional lost circulation material samples.

FIG. 7 is a graphical representation of the average yield strength for each of the samples. An analysis of the average yield strength value of Sample E indicates an average yield strength more than 3500% higher than Sample G and more than 3000% higher than Sample H. The average data indicate that the average yield strength of Sample F was more than 21000% higher than Sample G and about 19000% higher than Sample H. The average yield strength data suggest that the formulations of Samples E and F have extremely high yield strength properties compared to Samples G and H. The average data indicate that the yield strength of Sample F was greater than the yield strength of Sample E. A comparison of Sample E to Sample F indicates that the amount of binder can be modified to achieve a desired yield strength.

The present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A method to control lost circulation in a lost circulation zone in a wellbore using a gel-based lost circulation material (LCM), the method comprising the steps of:
   mixing a gel-based LCM pill, the gel-based LCM pill comprising:
      a volcanic ash, water, a viscosifier, a fluid loss control additive, a pH buffer, wherein the pH buffer is operable to adjust a pH, a de-foamer, wherein the de-foamer is operable to reduce the creation of foam, and a binder, wherein the binder is selected from the group consisting of drilling grade cements of Class A, Class B, Class C, Class G, Class H or combinations thereof, wherein a weight ratio of the volcanic ash to the binder is 1:1.5 to 1:3,
   wherein the gel-based LCM pill is operable to achieve a target gel characteristic to create the gel-based LCM;
   aligning an open end pipe in proximity to the lost circulation zone, the open end pipe configured to deliver the gel-based LCM pill to the lost circulation zone; and
   pumping the gel-based LCM pill through the open end pipe at a pill pump rate, wherein the pill pump rate is effective to position the gel-based LCM pill to create the gel-based LCM composition for contact with the lost circulation zone, the gel-based LCM being operable to alter the lost circulation zone.

2. The method of claim 1, further comprising the steps of:
   suspending pumping of a drilling fluid into the wellbore, wherein the step of suspending pumping occurs at a point in time prior to the step of pumping the gel-based LCM pill through the open end pipe;
   pumping a displacing mud into the open end pipe to displace the gel-based LCM pill from the open end pipe, wherein the step of pumping the displacing mud is effective to position the gel-based LCM pill in contact with the lost circulation zone; and
   shutting the wellbore for a gelling time, wherein the gelling time affords the gel-based LCM pill time to form the gel-based LCM.

3. The method of claim 1, where the pH buffer is selected from the group consisting of sodium hydroxide, potassium hydroxide, and lime.

4. The method of claim 1, wherein the viscosifier is XC polymer.

5. The method of claim 1, wherein the fluid loss control additive is psyllium husk powder.

6. The method of claim 1, wherein the gelling time is between 30 minutes and 2 hours.

* * * * *